United States Patent
Pehlke (10) Patent No.: US 11,309,946 B2
(45) Date of Patent: Apr. 19, 2022

(54) WIRELESS COMMUNICATION SYSTEM WITH SWITCH COMBINING AND SIMPLEX OPERATION MODES

(71) Applicant: SKYWORKS SOLUTIONS, INC., Woburn, MA (US)

(72) Inventor: David Richard Pehlke, Westlake Village, CA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 381 days.

(21) Appl. No.: 16/588,965

(22) Filed: Sep. 30, 2019

(65) Prior Publication Data

US 2020/0106497 A1 Apr. 2, 2020

Related U.S. Application Data

(63) Continuation of application No. 15/398,664, filed on Jan. 4, 2017, now Pat. No. 10,432,274.

(60) Provisional application No. 62/274,440, filed on Jan. 4, 2016.

(51) Int. Cl.
*H04B 7/06* (2006.01)
*H04B 1/00* (2006.01)
*H04B 1/38* (2015.01)
*H04B 1/52* (2015.01)

(52) U.S. Cl.
CPC ........... *H04B 7/0602* (2013.01); *H04B 1/006* (2013.01); *H04B 1/38* (2013.01); *H04B 1/52* (2013.01)

(58) Field of Classification Search
None
See application file for complete search history.

(56) References Cited

U.S. PATENT DOCUMENTS

| | | | |
|---|---|---|---|
| 2013/0016632 A1* | 1/2013 | Mujtaba | H04B 7/0608 370/275 |
| 2013/0028600 A1* | 1/2013 | Chang | H04B 1/0064 398/41 |
| 2015/0146582 A1* | 5/2015 | Galan | H04B 1/44 370/278 |
| 2016/0380604 A1* | 12/2016 | Chance | H01F 19/08 333/119 |

* cited by examiner

*Primary Examiner* — Shripal K Khajuria
(74) *Attorney, Agent, or Firm* — Chang & Hale LLP (57) ABSTRACT

Disclosed herein are various examples of architectures, circuits, devices and methods that provide wireless communication systems that can switch between switch combining and simplex operating modes. The switch combining modes utilize switching to dynamically route transmit and receive signals from a first antenna while the simplex operating modes route transmit signals to the first antenna and route receive signals from a second antenna. A controller is configured to control a duplexer to switch between the switch combining and the simplex operating modes.

20 Claims, 8 Drawing Sheets

WIRELESS COMMUNICATION SYSTEM WITH SWITCH COMBINING AND SIMPLEX OPERATION MODES

CROSS-REFERENCE TO RELATED APPLICATIONS

This application is a continuation of U.S. patent application Ser. No. 15/398,664 filed Jan. 4, 2017 and entitled "WIRELESS COMMUNICATION SYSTEM WITH SIMPLEX FRONT-END," which claims priority to U.S. Provisional Application No. 62/274,440 filed Jan. 4, 2016 and entitled "WIRELESS COMMUNICATION SYSTEM WITH SIMPLEX FRONT-END," each of which is expressly incorporated herein by reference in its entirety for all purposes.

BACKGROUND

Field

The present disclosure relates to duplexers for wireless communication systems.

Description of Related Art

Wireless communication configurations can use a single antenna for simultaneous transmission and reception. Where a device includes a plurality of antennas, multiple individual antennas can be used for simultaneous transmission and reception. When an antenna is tuned for transmission, the change in antenna tuning can adversely affect reception performance metrics.

SUMMARY

According to a number of implementations, the present disclosure relates to a communications system that includes a duplexer having a transmit port as input for a transmit signal, a receive port as output for a receive signal, and a plurality of antenna ports, the duplexer being configured to route the transmit signal from the transmit port to a first antenna port of the plurality of antenna ports, the first antenna port selected based on an antenna select signal, and to route the receive signal to the receive port from a second antenna port of the plurality of antenna ports, the second antenna port selected based on the antenna select signal. The communications system also includes a controller configured to provide the antenna select signal to the duplexer.

In some embodiments, the duplexer is configured to route the transmit signal to the first antenna port of the plurality of antenna ports based on a first antenna select signal and the duplexer is configured to route the receive signal from the first antenna port based on a second antenna select signal. In some embodiments, the controller is configured to generate the antenna select signal to provide antenna switch diversity. In some embodiments, the controller operates the duplexer so that the first antenna port is used for transmit signals and not receive signals and the second antenna port is used for receive signals and not transmit signals.

In some embodiments, the communications system further includes a first antenna tuner coupled to the first antenna port and a second antenna tuner coupled to the second antenna port. In further embodiments, the controller is configured to separately tune the first antenna tuner and the second antenna tuner. In further embodiments, the controller is configured to tune the first antenna tuner and the second antenna tuner at different times. In further embodiments, the controller is configured to tune the first antenna tuner during a transmit interslot period and to tune the second antenna tuner during a receive interslot period. In further embodiments, the controller is configured to tune the first antenna tuner to a first impedance and to tune the second antenna tuner to a second impedance different from the first impedance. In further embodiments, the controller is configured to tune the first antenna tuner and the second antenna tuner based on a band select signal. In further embodiments, the controller is configured to tune at least one of the first antenna tuner or the second antenna tuner based on the transmit signal. In further embodiments, the communications system further includes a coupler configured to provide a measurement of the transmit signal. In further embodiments, the controller is configured to tune at least one of the first antenna tuner or the second antenna tuner based on the receive signal. In further embodiments, the controller is configured to tune at least one of the first antenna tuner or the second antenna tuner based on a received signal strength indicator. The receive signal strength indicator can be determined as a result of down-conversion and demodulation of the desired and received reference signals.

In a number of implementations, the present disclosure relates to a radio-frequency (RF) module that includes a packaging substrate configured to receive a plurality of components. The module also includes a communications system implemented on the packaging substrate, the communications system including a duplexer having a transmit port as input for a transmit signal, a receive port as output for a receive signal, and a plurality of antenna ports, the duplexer being configured to route the transmit signal from the transmit port to a first antenna port of the plurality of antenna ports, the first antenna port selected based on an antenna select signal, and to route the receive signal to the receive port from a second antenna port of the plurality of antenna ports, the second antenna port selected based on the antenna select signal, the communications system further including a controller configured to provide the antenna select signal to the duplexer.

In some embodiments, the communications system further includes a first antenna tuner coupled to the first antenna port and a second antenna tuner coupled to the second antenna port. In further embodiments, the controller is configured to separately tune the first antenna tuner and the second antenna tuner. In some embodiments, the duplexer is coupled to one or more power amplifiers.

In accordance with some implementations, the present disclosure relates to a wireless device that includes a transceiver configured to generate a transmit radio-frequency (RF) signal and receive a receive RF signal and a plurality of antennas. The wireless device also includes a front-end module (FEM) in communication with the first antenna and the second antenna, the FEM including a packaging substrate configured to receive a plurality of components, the FEM further including a communications system implemented on the packaging substrate, the communications system including a duplexer having a transmit port as input for the transmit RF signal, a receive port as output for the receive RF signal, and a plurality of antenna ports respectively coupled to the plurality of antennas, the duplexer being configured to route the transmit RF signal from the transmit port to a first antenna port of the plurality of antenna ports selected based on an antenna select signal and route the receive RF signal to the receive port from a second antenna port of the plurality of antenna ports selected based on the antenna select signal, the communications system further including a controller configured to provide the antenna select signal to the duplexer.

In some embodiments, the communications system further includes a first antenna tuner coupled to the first antenna port and a second antenna tuner coupled to the second antenna port and the controller is configured to separately tune the first antenna tuner and the second antenna tuner.

In accordance with one or more implementations, a communications system is provided that includes a duplexer having a transmit port as input for a transmit signal, a receive port as output for a receive signal, and a plurality of antenna ports, the duplexer being configured to route the transmit signal from the transmit port to a first or second antenna port of the plurality of antenna ports based on an antenna select signal, and to route the receive signal to the receive port from a first or second antenna port of the plurality of antenna ports based on the antenna select signal. The communications system also includes a controller configured to provide the antenna select signal to the duplexer and to switch between a switch combining operating mode that causes the duplexer to route the transmit signal from the transmit port to the first antenna port and to route the receive signal from the first antenna port to the receive port, and a simplex operating mode that causes the duplexer to route the transmit signal from the transmit port to the first antenna port and to route the receive signal from the second antenna port to the receive port.

For purposes of summarizing the disclosure, certain aspects, advantages and novel features of some embodiments have been described herein. It is to be understood that not necessarily all such advantages may be achieved in accordance with any particular embodiment. Thus, the embodiments provided herein may be carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

In some wireless communication configurations, an antenna is used for transmission and reception simultaneously. When an antenna is tuned for transmission, the change in antenna tuning can adversely affect reception performance metrics. In particular, an antenna can be tuned for transmission during a transmission interslot period that does not coincide with a reception interslot period, resulting in degradation of the reception error vector magnitude (EVM).

Disclosed herein are various examples of circuits, devices and methods that can be configured to, among other things, address the foregoing challenges associated with wireless communication systems. In some implementations as described herein, individual antennas are configured as a simplex channel that transmits or receives, but does not transmit and receive at the same time. In certain implementations, a communications system (e.g., a front end module) can be configured to dynamically switch between a simplex configuration having an antenna for transmitting signals and an antenna for receiving signals, and a switch combining configuration that can use the same antenna for transmitting and receiving signals.

Examples are provided herein of architectures, circuits, devices and methods that provide a simplex architecture so that an antenna serves only transmission or reception signals but not both at the same time. A duplexer can include transmit and receive ports that can be dynamically coupled to first and second antenna ports to provide a transmit path and a receive path. The disclosed systems can include a controller configured to provide an antenna select signal to the duplexer to control operation of the paths between the signal ports and the antenna ports. The duplexer can include antenna tuners associated with individual antennas, the antenna tuners being separately controllable by the controller. In certain implementations, the duplexer can be configured to operate in a simplex configuration in a first operating mode and in a switch combining configuration in a second operating mode. In various implementations, a communication system incorporating the concepts disclosed herein can use a first antenna for transmission only, a second antenna for providing primary receiver functionality, and a third antenna for providing diversity receiver functionality.

Advantageously, the disclosed systems, devices, architectures, and modules enable separate transmit and receive antenna tuning states. This can allow the impedance and/or radiation condition for transmit and receive antennas to be tailored simultaneously for improved performance. Similarly, the timing of the adjustment in gain from or to an antenna can be dedicated so that neither antenna experiences a change deep into the slot timing where it can degrade performance. The disclosed architectures allow for dynamic modifications in the timing of the adjustment in tuning parameters. Antenna switch diversity can be maintained using the concepts disclosed herein. In some implementations, to improve or tune performance, measurements based on transmit signals alone (e.g., using a coupler) and/or using received signal strength indicator (RSSI) can be applied to tailor the antenna tuner state.

Beneficially, the disclosed architectures allow for antenna tuners to be adjusted at advantageous times (e.g., during interslot periods) so that gain changes do not significantly degrade performance metrics of the transmit path and/or the receive path. The disclosed architectures also beneficially allow for antenna switch diversity. Furthermore, the number of antenna tuners is not necessarily increased from other implementations that do not utilize the disclosed architectures. Moreover, different tuning states can be applied for transmit and receive paths so that either path is not significantly degraded by the other.

Figure 1:
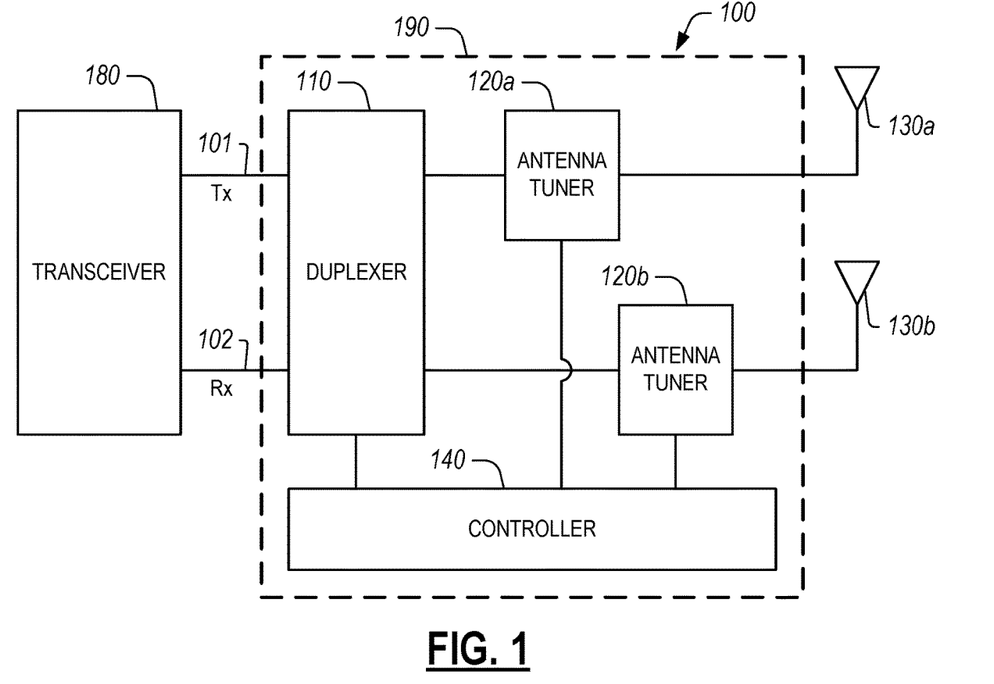
FIG. 1 illustrates an example wireless communication configuration configured to transmit and receive on multiple antennas simultaneously, the configuration having a module disposed between the output of a transceiver and a plurality of antennas.

FIG. 1 schematically shows an example wireless communication configuration 100 that includes a module 190 disposed between a transceiver 180 and a plurality of antennas 130a-130b. The module 190 includes a duplexer 110 having a transmit port 101 as input for a transmit signal provided by the transceiver 180 and a receive port 102 as output for a receive signal provided to the transceiver 180. The duplexer 110 has a plurality of antenna ports respectively coupled to the plurality of antennas 130a-130b via respective antenna tuners 120a-120b. The module 190 further includes a controller 140 that controls the duplexer 110 and tunes the antenna tuners 120a-120b. The antenna tuners 120a-120b can be tuned by the controller 140 to provide, for example and without limitation, a tunable gain, a tunable phase-shift, a tunable impedance, a tunable antenna shape, a tunable radiation pattern, any combination thereof or the like.

In some embodiments, the controller 140 can configure the duplexer 110 to route the transmit signal from the transmit port 101 to multiple antenna ports and to route the receive signal from multiple antenna ports to the receive port 102. Thus, in some embodiments, the wireless communication configuration 100 can be used to transmit and receive on multiple antennas simultaneously. In some implementations, the duplexer 110 routes transmit signals and receive signals to a single antenna in a switch combining operating mode. In certain implementations, the duplexer 110 routes transmit signals to a first antenna 130a and receive signals from a second antenna 130b in a simplex operating mode. In some embodiments, the module 190 can be configured to dynamically switch between the switch combining operating mode and the simplex operating mode.

Figure 2:
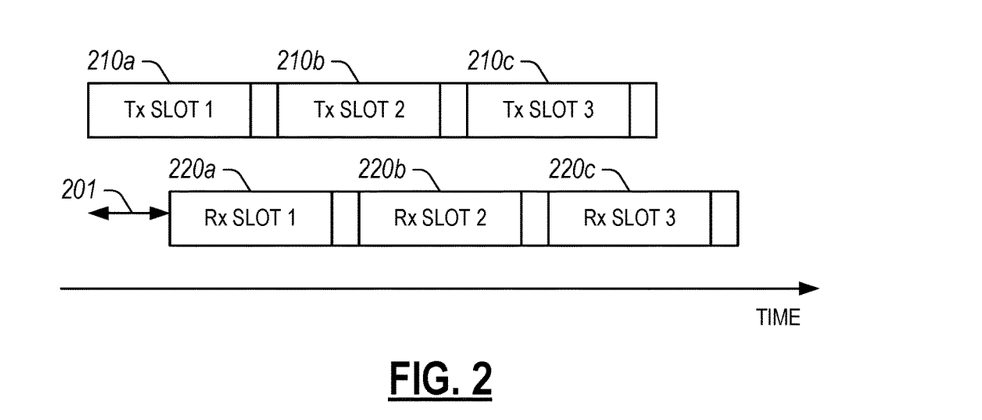
FIG. 2 illustrates an example of transmission during a plurality of transmission slots and reception during a plurality of reception slots.

When an antenna is simultaneously used for reception and transmission, tuning the antenna (e.g., by tuning the respective antenna tuner) for transmission can adversely affect reception quality metrics. As shown in FIG. 2, an antenna can be used to transmit during a plurality of transmission slots 210a-210c and to receive during a plurality of reception slots 220a-220c. Each transmission slot 210a-210c can be separated by a transmission interslot period during which data is not transmitted. In some embodiments, the transmission interslot period is approximately 20 microseconds. Similarly, each reception slot 220a-220b can be separated by a reception interslot period during which data is not received. In various implementations, transmission slots 210a-210c and reception slots 220a-220c may not be aligned. For example, the Long Term Evolution (LTE) specification specifies that user equipment (UE) transmissions be time-aligned when arriving back at an eNode B tower. Timing advance can cause an offset 201 between transmission slots 210a-210c and reception slots 220a-220c which can be as much as 667 microseconds for some 3GPP cell sizes. Tuning the antenna for transmission during a transmission interslot period can make a potentially large gain change that adversely affects the reception EVM, as the gain change can occur deep into the reception slot.

Thus, in some embodiments and with reference to FIG. 1, the controller 140 can configure the duplexer 110 to route the transmit signal from the transceiver 180 through the transmit port 101 to a first antenna port (and to an associated first antenna) of the plurality of antenna ports, the first antenna port selected based at least in part on an antenna select signal received from the controller 140. Similarly, the controller 140 can configure the duplexer 110 to route the receive signal to the transceiver 180 through the receive port 102 from a second antenna port (and from an associated second antenna) of the plurality of antenna ports, the second antenna port selected based at least in part on the antenna select signal received from the controller 140. Thus, in some embodiments, the wireless communication configuration 100 can be used to transmit on one of the multiple antennas and to receive on another of the multiple antennas.

The duplexer 110 can be configured to route the transmit signal from the transceiver 180 to a first antenna port of the plurality of antenna ports (and to the first antenna 130a of the plurality of antennas) based on a first antenna select signal from the controller 140 and to route the receive signal to the transceiver 180 from the first antenna port (and from the first antenna 130a) based on a second antenna select signal from the controller 140. Thus, the controller 140 can generate the antenna select signal to provide antenna switch diversity.

Thus, each antenna 130a-130b can be used for transmission or reception, but not both at the same time. The controller 140 can tune the antenna tuners 120a-120b at an appropriate time. For example, the controller 140 can tune the antenna tuners 120a, 120b during a transmission interslot period for an antenna used for transmission or during a reception interslot period for an antenna used for reception. Thus, gain changes for transmission have little or no effect on the EVM and/or other performance metrics for reception. Similarly, gain changes for reception have little or no effect on performance metrics for transmission.

The controller 140 can separately tune the first antenna tuner 120a and the second antenna tuner 120b. This allows the controller 140 to tune a tuner for transmission so that it does not significantly compromise reception and/or to tune a tuner for reception so that it does not significantly compromise transmission. For example, the controller 140 can tune the first antenna tuner 120a at a first time and the second antenna tuner 120b at a second time different than the first time (e.g., during non-overlapping transmission interslot periods and reception interslot periods). As another example, the controller 140 can tune the first antenna tuner 120 to a first impedance and tune the second antenna tuner 120b to a second impedance different from the first impedance.

In some embodiments, the antenna tuner state can be based at least in part on the transmit signal and can be offset a known amount for reception. In some embodiments, the antenna tuner state can be based at least in part on the receive signal. For example, the antenna tuner state can be based at least in part on a received signal strength indicator (RSSI). In some embodiments, the antenna tuner state can be based at least in part on a band select signal indicating one or more cellular frequency bands of the transmit signal and/or receive signal. In some embodiments, the antenna tuner state can be based at least in part on a measurement of the transmit signal from one or more couplers between the antennas 130a, 130b and the duplexer 110.

Figure 3:
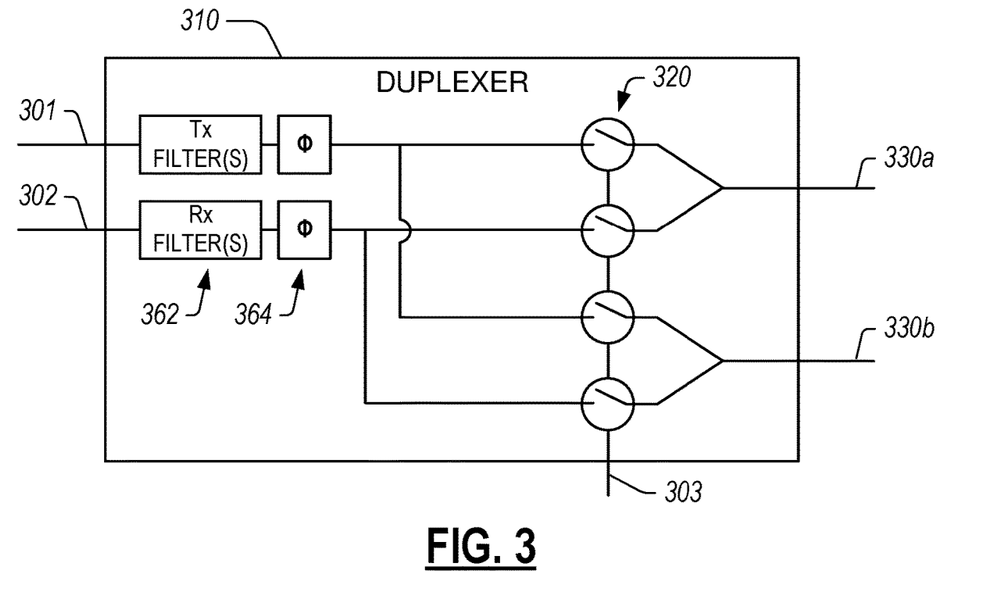
FIG. 3 illustrates an example of a duplexer including single-pole/single-throw (SPST) switches.

FIG. 3 shows an example of a duplexer 310 including single-pole/single-throw (SPST) switches 320, transmit and receive filters 362, and phase shift components 364. The duplexer 310 has a transmit port 301, a receive port 302, and a plurality of antenna ports 330a, 330b. By controlling the switches 320 via a control line 303, the duplexer 310 can route signals received at the transmit port 301 to one or more of the antenna ports 330a-330b through targeted transmit filters 362 and phase shift components 364. Similarly, by controlling the switches 320 via the control line 303, the duplexer 310 can route signals from one or more of the antenna ports 330a-330b to the receive port 302 through targeted receive filters 362 and phase shift components 364. For example, in a switch combining operating mode, by closing the top two or the bottom two switches 320, the duplexer 310 can route signals from the transmit port 301 to a targeted antenna port 330a or 330b and route signals from the targeted antenna port 330a or 330b to the receive port 302. As an example of a simplex operating mode, by closing the top switch and the bottom switch, the duplexer 310 can route signals from the transmit port 301 to the first antenna port 330a and route signals from the second antenna port 330b to the receive port 302. As an example of another simplex operating mode, by closing the middle switches, the duplexer 310 can route signals from the transmit port 301 to the second antenna port 330b and route signals from the first antenna port 330a to the receive port 302. In some embodiments, when operating in a switch combining mode, the antenna port not being used for primary transmit and receive operations can be used for diversity receive functionality and/or for other purposes.

In certain implementations, the duplexer 310 routes transmit signals from the transmit port 301 to one of the antenna ports 330a, 330b and routes receive signals from another of the antenna ports 330a, 330b to the receive port 302. In various implementations, the duplexer 310 uses the switches 320 to create a first signal path between a first signal port (e.g., the transmit port 301 or the receive port 302) and the first antenna port 330a and to create a second signal path between a second signal port different from the first signal port (e.g., the transmit port 301 or the receive port 302) and the second antenna port 330b.

Figure 4:
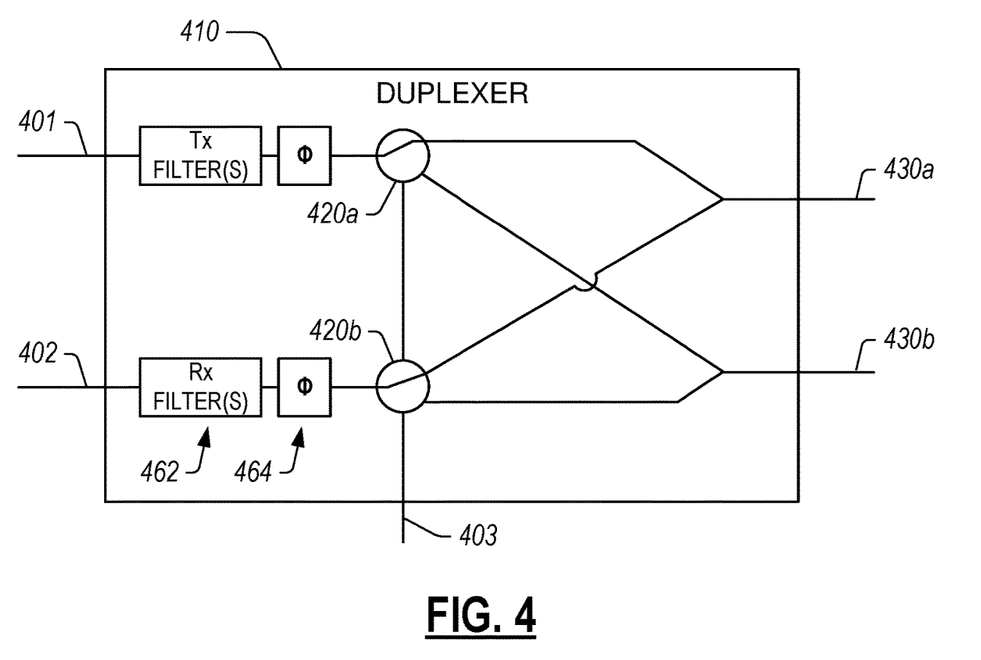
FIG. 4 illustrates an example of a duplexer including single-pole/double-throw (SPDT) switches.

FIG. 4 shows an example of a duplexer 410 including single-pole/double-throw (SPDT) switches 420a, 420b, transmit and receive filters 462, and phase shift components 464. The duplexer 410 has a transmit port 401, a receive port 402, and a plurality of antenna ports 430a, 430b. By controlling the switches 420a, 420b via a control line 403, the duplexer 410 can route signals from the transmit port 401 to either of the antenna ports 430a, 430b. Similarly, by controlling the switches 420a, 420b via the control line 403, the duplexer 410 can route signals from one of the antenna ports 430a, 430b to the receive port 402. In certain implementations, the duplexer 410 routes transmit signals from the transmit port 401 to one of the antenna ports 430a, 430b and routes receive signals from another of the antenna ports 430a, 430b to the receive port 402. In various implementations, the duplexer 410 uses the switches 420a, 420b to create a first signal path between a first signal port (e.g., the transmit port 401 or the receive port 402) and the first antenna port 430a and to create a second signal path between a second signal port different from the first signal port (e.g., the transmit port 401 or the receive port 402) and the second antenna port 430b. In certain implementations, the duplexer 410 uses the switches to direct transmit and receive signals to and from the same antenna port to the transmit port 401 and the receive port 402, respectively. In some embodiments, when operating in such a switch combining mode, the antenna port not being used for primary transmit and receive operations can be used for diversity receive functionality and/or for other purposes. Furthermore, it is to be understood that more than two antennas may be implemented in the disclosed configurations of FIGS. 3 and 4. Three or more antennas may be used to provide diversity receive functionality, carrier aggregation, MiMo capability, and the like.

In some implementations, any of the duplexers (or the modules including a duplexer) disclosed herein can include power amplifiers or other components. For example, the duplexer can be implemented as a power amplifier with integrated duplexer (or PAiD). As used herein, a PAiD includes one or more power amplifiers, one or more duplexers, and one or more antenna switch modules. Any of the modules or duplexers disclosed herein can be implemented as a PAiD.

Figure 5A:
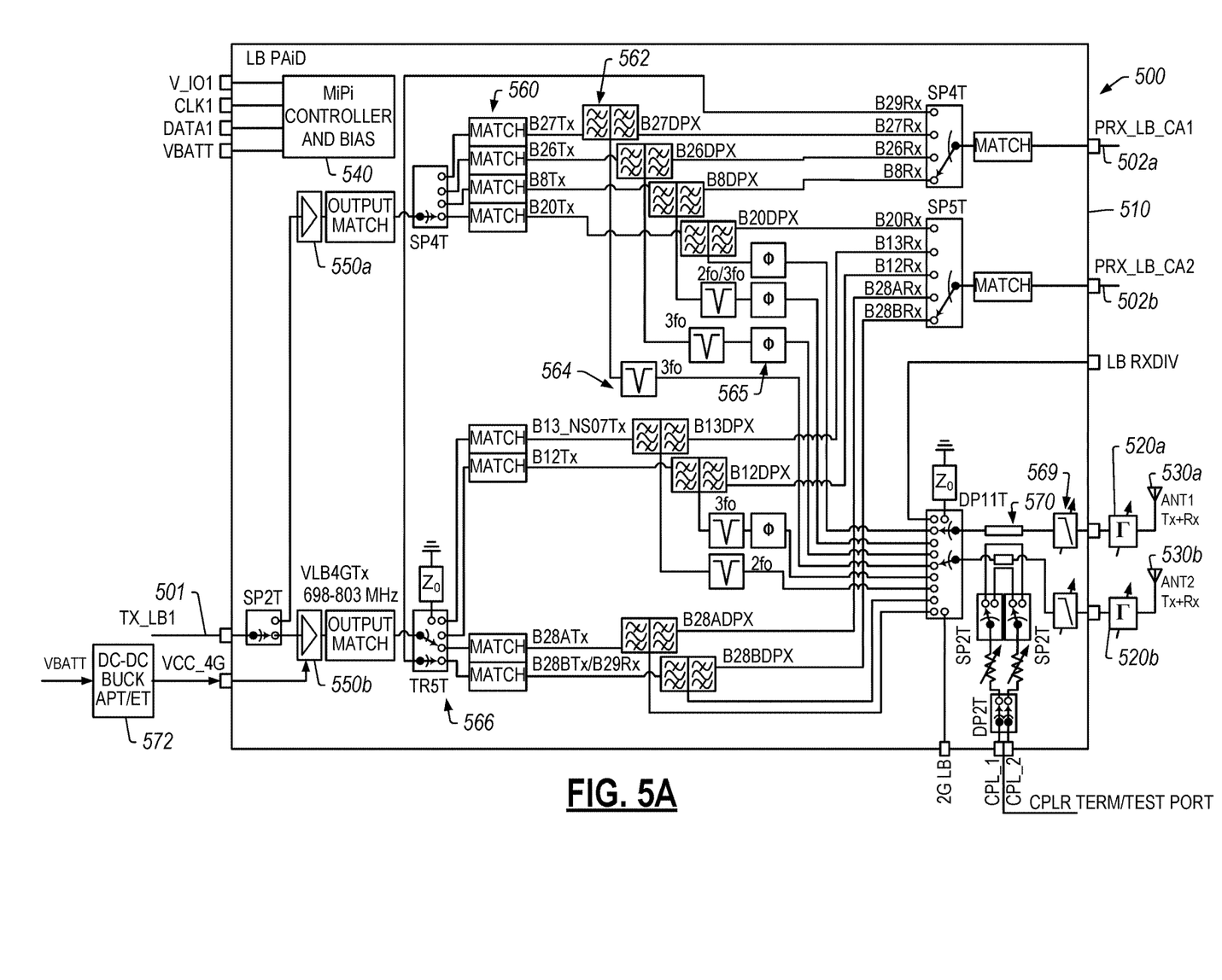
FIGS. 5A and 5B illustrate an example wireless communication system with a power amplifier with integrated duplexer that can support simultaneous transmission and reception on multiple antennas.
Figure 5B:
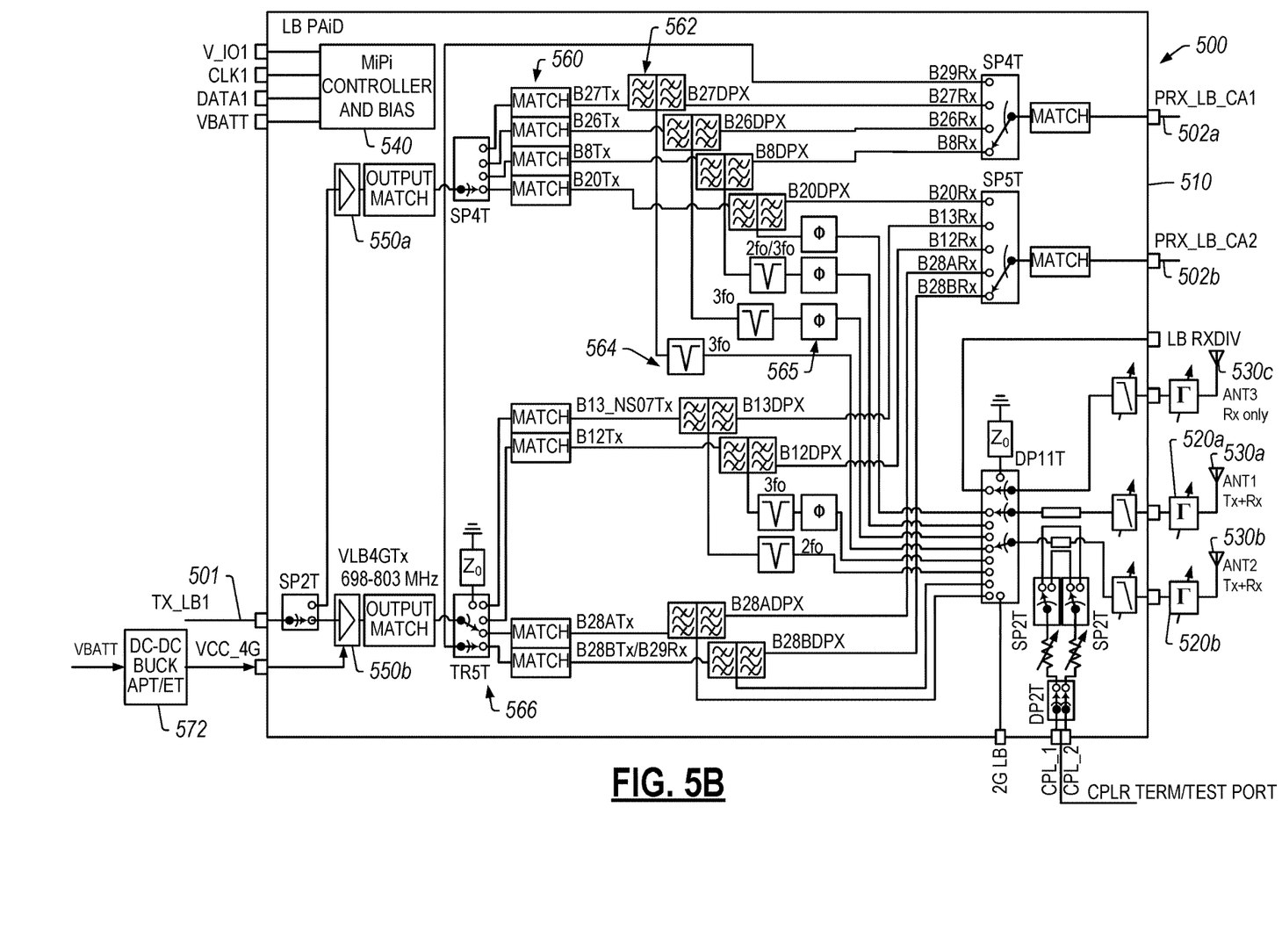
Figure 6A:
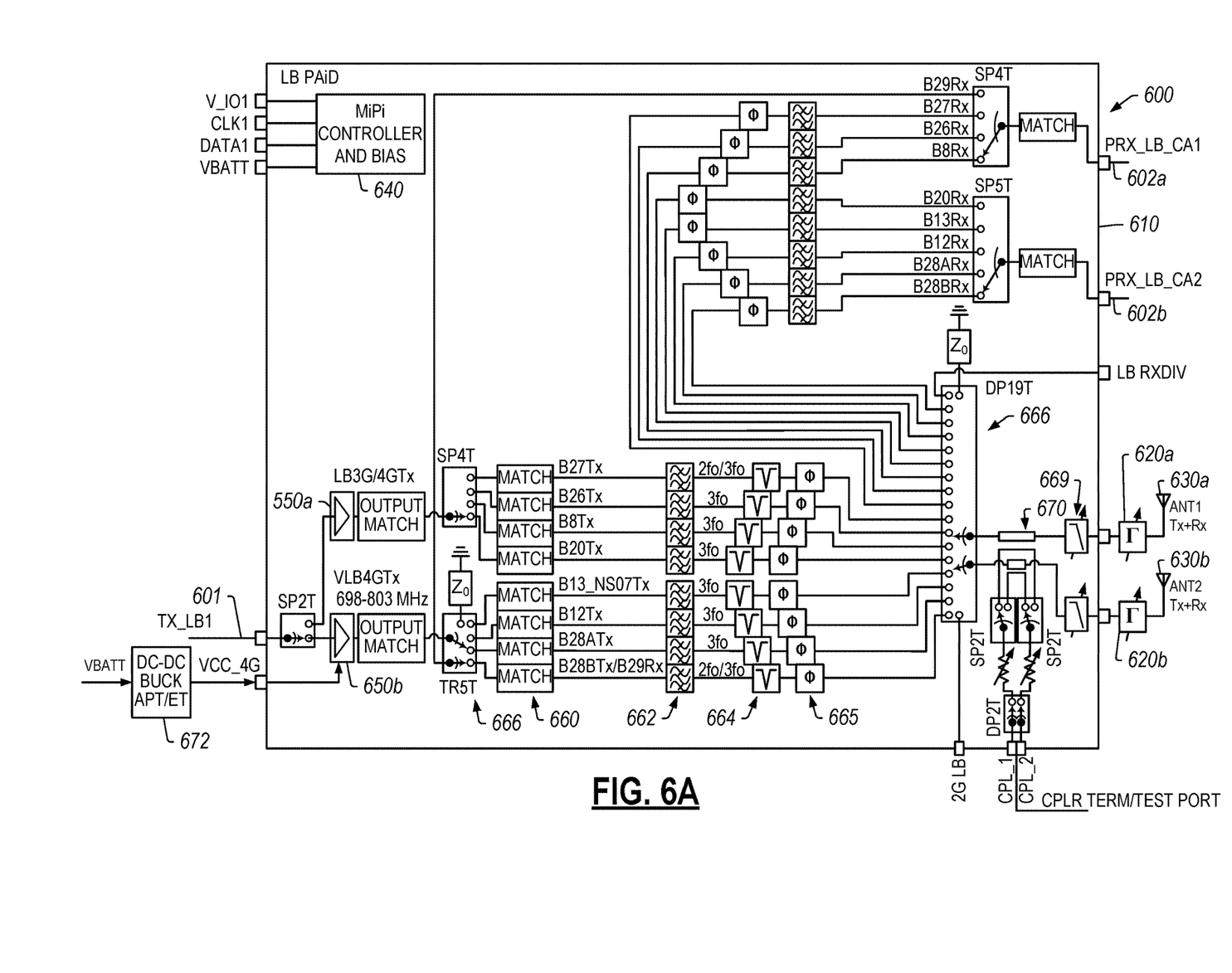
FIG. 6A illustrates an example wireless communication system with a power amplifier with integrated duplexer that can support transmission and reception on either of multiple antennas.

FIGS. 5A, 5B and 6A show examples of a PAiD. FIG. 5A shows a wireless communication system 500 that can support simultaneous transmission and reception on multiple antennas 530a, 530b. The wireless communication system 500 includes a PAiD 510 having a transmit port 501 for receiving a transmit signal (e.g., from a transceiver) and receive ports 502a-502b for providing a receive signal (e.g., to a transceiver). The PAiD 510 further has a plurality of antenna ports respectively coupled to a plurality of antennas 530a, 530b via a respective plurality of antenna tuners 520a, 520b.

The PAiD 510 includes power amplifiers 550a-550b, various matching components 560, various diplexers 562, various harmonic rejection components 564, various phase shift components 565, various switches 566, and various filters 569. The PAiD 510 further includes couplers 570 coupled to a test port for providing a measurement of the transmit signal. The PAiD 510 further includes a controller 540 for routing various signals through the PAiD and, optionally, for controlling the antenna tuners 520a-520b.

The wireless communication system 500 further includes a voltage converter 572 for receiving a battery voltage and providing a supply voltage to the PAiD 510. It should be noted that although the low band (LB) frequencies are shown in FIGS. 5A, 5B and 6A, similar architectures or systems can be implemented for mid-band frequencies, high-band frequencies, or any combination of frequencies.

The wireless communication system 500 illustrates a system with ganged filters 562. The system 500 can be configured to direct receive signals from a particular antenna to a particular receive port and to direct transmit signals from the transmit port 501 to the same antenna. In some embodiments, an antenna that is not coupled to the ganged filters 562 can be coupled to a separate receive-only module so that both antennas can be used at the same time, one for transmit-only, receive-only, or transmit and receive with the PAiD 510 and one for a different module (e.g., diversity receiver, MIMO module, etc.). As an example, the antenna not coupled to the ganged filters 562 can be coupled to the LB RXDIV pin for use in another module, front end system, or the like.

FIG. 5B illustrates a wireless communication system 500 that is similar to that illustrated in FIG. 5A, with the addition of another antenna 530c coupled to an antenna switch module. In certain implementations, one antenna can be used for transmit only while the other two antennas provide receive only functionality. In various implementations, one antenna can provide transmit and receive functionality while another antenna provides receive functionality and the third provides diversity receive functionality.

FIG. 6A illustrates a wireless communication system 600 that can support transmission and reception on either of multiple antennas. The wireless communication system 600 includes a PAiD 610 having a transmit port 601 for receiving a transmit signal (e.g., from a transceiver) and receive ports 602a, 602b for providing a receive signal (e.g., to a transceiver). The PAiD 610 further has a plurality of antenna ports respectively coupled to a plurality of antennas 630a, 630b via a respective plurality of antenna tuners 620a, 620b.

The PAiD 610 includes power amplifiers 650a, 650b, various matching components 660, various bandpass filters 662, various harmonic rejection components 664, various phase shift components 665, and various switches 666. The PAiD 610 further includes couplers 670 coupled to a test port for providing a measurement of the transmit signal. The PAiD 610 further includes a controller 640 for routing various signals through the PAiD and, optionally, for controlling the antenna tuners 620a-620b.

The wireless communication system 600 further includes a voltage converter 672 for receiving a battery voltage and providing a supply voltage to the PAiD 610.

The system 600 includes a PAiD 610 having a transmit port 601 as input for a transmit signal, receive ports 602a, 602b as output for a receive signal, and a plurality of antenna ports coupled to antennas 630a, 630b. The PAiD 610 can be configured to route the transmit signal from the transmit port 601 to a first or second antenna of the plurality of antennas 630a, 630b based on an antenna select signal, and to route the receive signal to a targeted receive port 602a, 602b from a first or second antenna port of the plurality of antenna ports based on the antenna select signal. The PAiD 610 can be configured to switch between a switch combining operating mode that causes the duplexer to route the transmit signal from the transmit port 601 to the first antenna port 630a and to route the receive signal from the first antenna port 630a to the receive port 602a, and a simplex operating mode that causes the PAiD 610 to route the transmit signal from the transmit port 601 to the first antenna port 630a and to route the receive signal from the second antenna port 630b to the receive port 602a. This architecture simultaneously supports both simplex (e.g., dedicated Tx-only and Rx-only antenna connections) with switch-combined duplexer connection of the Tx and Rx filters toward a shared signal path.

Similar to FIG. 5B, the system 600 can include one or more additional antennas coupled to the antenna switch module. In various implementations, one antenna can be used for transmit only while the other two antennas provide receive only functionality. In various implementations, one antenna can provide transmit and receive functionality while another antenna provides receive functionality and the third provides diversity receive functionality.

As compared to the PAiD 510 of FIG. 5, the PAiD 610 of FIG. 6 has simplified routing and improved isolation. Further, the PAiD 610 includes bandpass filters 662 rather than diplexers 552 as in the PAiD 510 of FIG. 5. The wireless communication system 600 of FIG. 6 includes the same number of antenna tuners as the wireless communication system 500 of FIG. 5. It is to be understood that although two antenna ports and/or two antennas are illustrated in FIGS. 1 and 3-6, more antenna ports and associated antennas can be implemented using the features disclosed herein to provide the same or similar advantages as described herein. Switching in the PAiD 610 determines whether filters get ganged and provides ganged filters or separation of Tx and Rx filters and routing to separate Tx-only and Rx-only antennas. The switching in the PAiD 510 and/or PAiD 610 can include throws dedicated to transmit signals and throws dedicated to receive signals.

The system 600 can be configured to tune an antenna for transmit-only on a first antenna and to tune a different antenna for receive-only. The system 600 can be configured to tune an antenna for transmit and receive on a first antenna and to use the other antenna for diversity receive functionality, MiMo functionality, carrier aggregation, and the like. For example, the other antenna can be dynamically coupled to another receive-only module for diversity purposes or for downlink MiMo purposes.

Figure 6B:
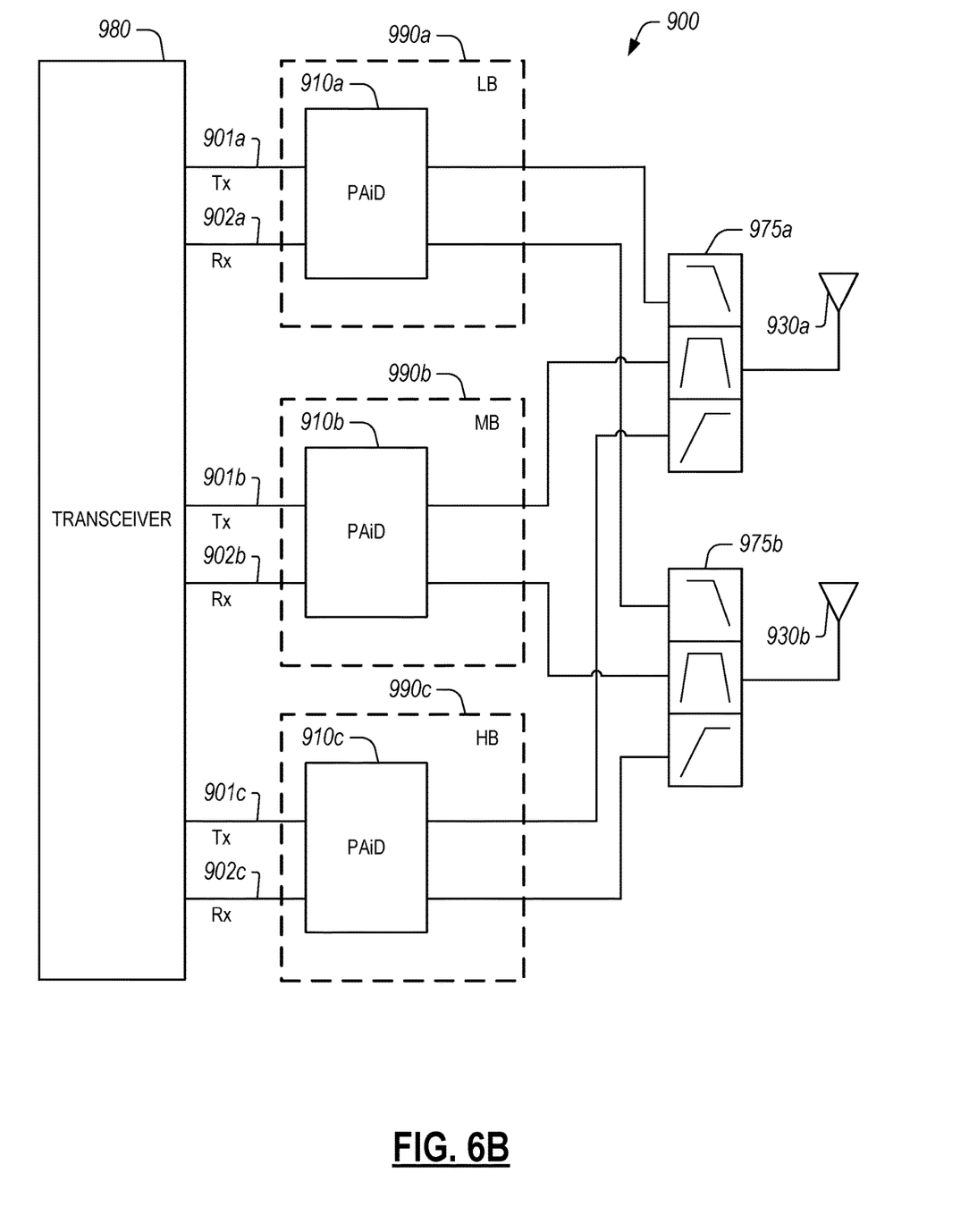
FIG. 6B illustrates an example wireless communication system with a plurality of modules for different frequency bands, each module including a duplexer that can support simplex or switch combining operating modes.

FIG. 6B illustrates an example wireless communication system 900 with a plurality of modules 990a-990c for different frequency bands (e.g., low band (LB), mid band (MB), and high band (HB)), each module 990a-990c including a PAiD 910a-910c that can support simplex operation and/or switch combining operation. In some embodiments, the PAiDs 910a-910c are configured to dynamically switch between simplex and switch combining operating modes. The system 900 includes a transceiver 980 for providing transmit and receive signals. Each PAiD 910a-910c includes a transmit port 901a-901c as an input for a transmit signal within a respective frequency band (e.g., LB, MB, or HB) and a receive port 902a-902b as an output for a receive signal within a respective frequency band. The modules 990a-990c are coupled to triplexers 975a, 975b configured to direct signals to the appropriate module 990a-990c, depending on a frequency of the signal. The triplexers 975a, 975b are respectively coupled to antennas 930a, 930b that transmit and receive signals. Each PAiD 910a-910c can be configured to operate in a simplex operating mode (as described herein). In some implementations, each PAiD 910a-910c can be configured to switch between operating in a simplex operating mode and a switch combining mode (as described herein). Accordingly, the system 900 can be configured to provide transmit-only functionality in a low band while mid-band and high band can be receive-only or both transmit and receive. Any permutation of bands (e.g., LB, MB, HB, etc.) configured for transmit only, receive only, and transmit and receive is encompassed by this disclosure.

Figure 7:
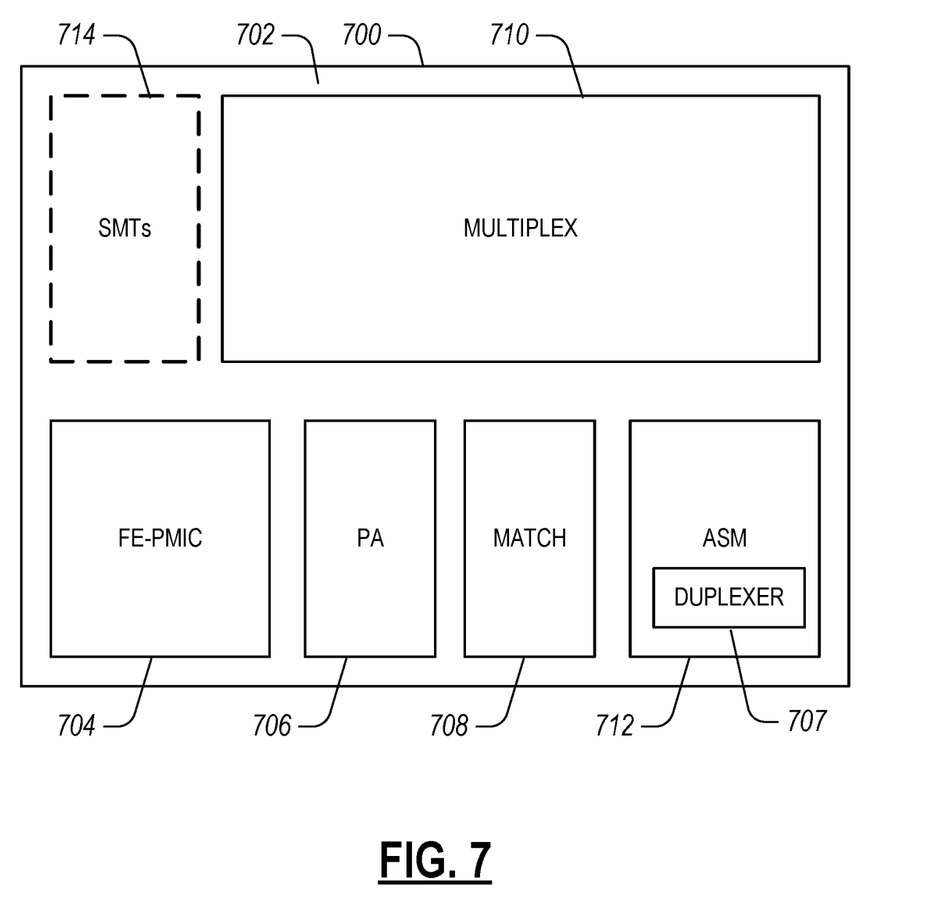
FIG. 7 illustrates an example module that at least partially incorporates at least some elements of the wireless communications configurations of FIGS. 1 5, and 6.

FIG. 7 shows that in some embodiments, some or all of wireless communication configurations (e.g., those shown in FIGS. 1, 5, and 6) can be implemented, wholly or partially, in a module. Such a module can be, for example, a front-end module (FEM). In the example of FIG. 7, a module 700 can include a packaging substrate 702, and a number of components can be mounted on such a packaging substrate 702. For example, an FE-PMIC component 704, a power amplifier assembly 706, a match component 708, and a multiplexer assembly 710 can be mounted and/or implemented on and/or within the packaging substrate 702. Other components such as a number of SMT devices 714 and an antenna switch module (ASM) 712 can also be mounted on the packaging substrate 702. The ASM can include a duplexer 707 as described herein that provides two simplex channels. Although all of the various components are depicted as being laid out on the packaging substrate 702, it will be understood that some component(s) can be implemented over other component(s).

In some implementations, a device and/or a circuit having one or more features described herein can be included in an RF electronic device such as a wireless device. Such a device and/or a circuit can be implemented directly in the wireless device, in a modular form as described herein, or in some combination thereof. In some embodiments, such a wireless device can include, for example, a cellular phone, a smart-phone, a hand-held wireless device with or without phone functionality, a wireless tablet, etc.

Figure 8:
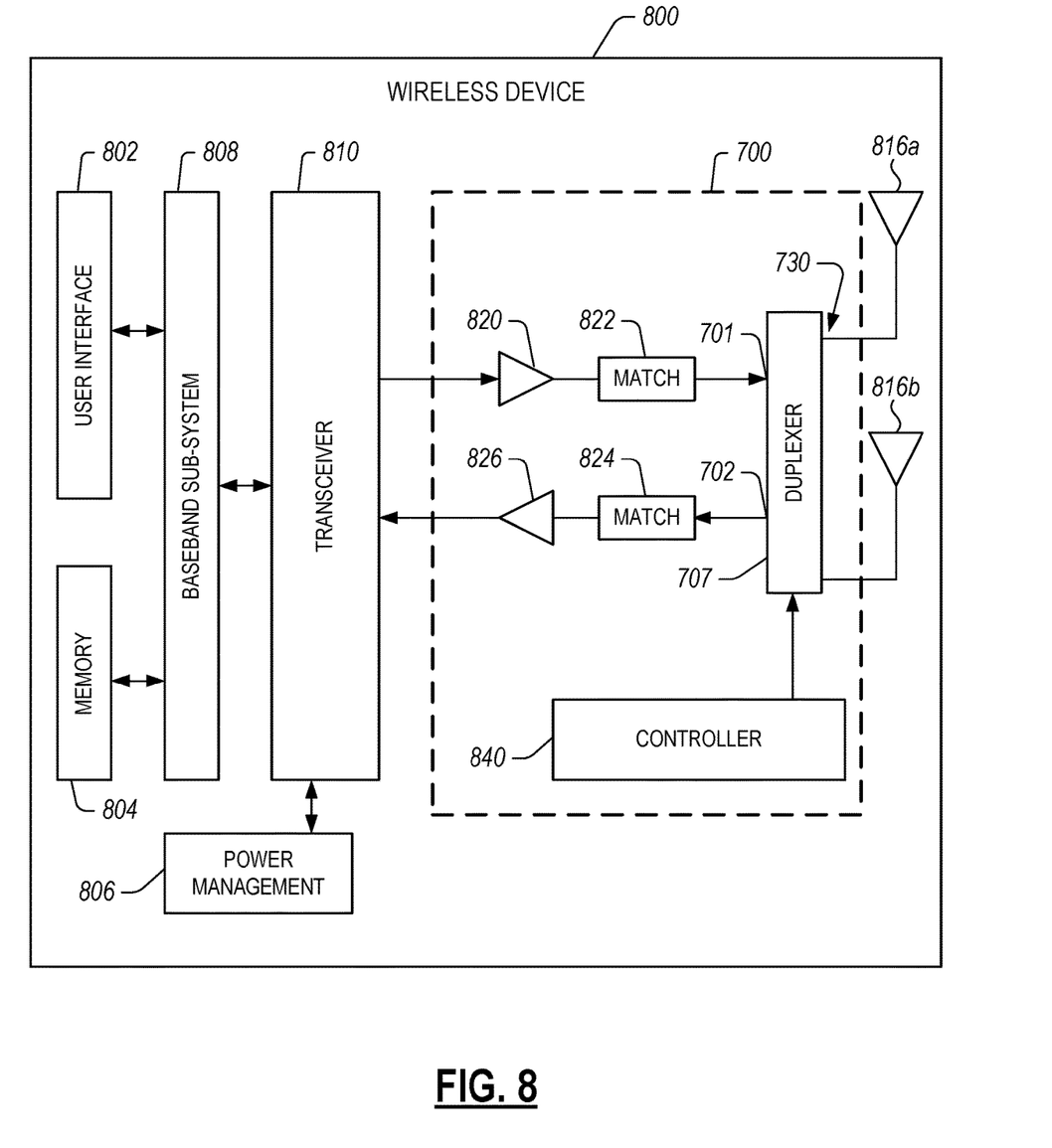
FIG. 8 illustrates an example wireless device having one or more advantageous features described herein.

FIG. 8 depicts an example wireless device 800 having one or more advantageous features described herein. In the context of a module having one or more features as described herein, such a module can be generally depicted by a dashed box 700, and can be implemented as, for example, a front-end module (FEM).

Referring to FIG. 8, power amplifiers (PAs) 820 can receive their respective RF signals from a transceiver 810 that can be configured and operated in known manners to generate RF signals to be amplified and transmitted, and to process received signals. Similarly, low-noise amplifiers (LNAs) 826 can receive their respective signals for delivery to the transceiver 810. The transceiver 810 is shown to interact with a baseband sub-system 808 that is configured to provide conversion between data and/or voice signals suitable for a user and RF signals suitable for the transceiver 810. The transceiver 810 can also be in communication with a power management component 806 that is configured to manage power for the operation of the wireless device 800. Such power management can also control operations of the baseband sub-system 808 and the module 700.

The baseband sub-system 808 is shown to be connected to a user interface 802 to facilitate various input and output of voice and/or data provided to and received from the user. The baseband sub-system 808 can also be connected to a memory 804 that is configured to store data and/or instructions to facilitate the operation of the wireless device, and/or to provide storage of information for the user.

In the example wireless device 800, outputs of the PAs 820 are shown to be matched (via respective match circuits 822) and routed to a duplexer 707 for routing to a particular antenna 816a, 816b. The duplexer 707 can be configured as any of the duplexers described herein. In some embodiments, the duplexer 707 can include an antenna switch module for routing to a targeted antenna. Received signals are routed to low-noise amplifiers (LNAs) 826 through a match circuit 824. The duplexer 707 includes a transmit port 701 for receiving a transmit RF signal and a receive port 702 for providing a receive RF signal. The duplexer 707 also includes a plurality of antenna ports 730 respectively coupled to the plurality of antennas 816a, 816b. The duplexer 707 is configured to route the transmit RF signal from the transmit port 701 to a first antenna port of the plurality of antenna ports 730 selected based on an antenna select signal. The duplexer 707 is also configured to route the receive RF signal to the receive port 702 from a second antenna port of the plurality of antenna ports 730 selected based on the antenna select signal. The module also includes a controller 840 configured to provide the antenna select signal to the duplexer 707, as described in greater detail herein.

A number of other wireless device configurations can utilize one or more features described herein. For example, a wireless device does not need to be a multi-band device. In another example, a wireless device can include additional antennas such as diversity antenna, and additional connectivity features such as Wi-Fi, Bluetooth, and GPS.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A communications system comprising:
a duplexer having a transmit port as input for a transmit signal, a receive port as output for a receive signal, a first antenna port, and a second antenna port, the duplexer configured to route the transmit signal from the transmit port to the first antenna port or to the second antenna port based on an antenna select signal, and to route the receive signal to the receive port from the first antenna port or from the second antenna port based on the antenna select signal; and
a controller configured to provide the antenna select signal to the duplexer and to switch between a switch combining operating mode that causes the duplexer to route the transmit signal from the transmit port to the first antenna port and to route the receive signal from the first antenna port to the receive port, and a simplex operating mode that causes the duplexer to route the transmit signal from the transmit port to the first antenna port and to route the receive signal from the second antenna port to the receive port.

2. The communications system of claim 1 wherein, in the simplex operating mode, the duplexer is configured to route the transmit signal from the transmit port to the first antenna port during a plurality of transmission slots with individual transmission slots separated by transmission interslot periods and to route the receive signal to the receive port from the second antenna port during a plurality of reception slots with individual reception slots separated by reception interslot periods.

3. The communications system of claim 2 further comprising a first antenna tuner coupled to the first antenna port and a second antenna tuner coupled to the second antenna port.

4. The communications system of claim 3 wherein, in the simplex operating mode, the controller is configured to tune the first antenna tuner during individual transmission interslot periods, and to tune the second antenna tuner during individual reception interslot periods.

5. The communications system of claim 3 wherein the controller is configured to separately tune the first antenna tuner and the second antenna tuner.

6. The communications system of claim 3 wherein the controller is configured to tune the first antenna tuner and the second antenna tuner at different times.

7. The communications system of claim 3 wherein the controller is configured to tune at least one of the first antenna tuner or the second antenna tuner based on the transmit signal.

8. The communications system of claim 7 further comprising a coupler configured to provide a measurement of the transmit signal.

9. The communications system of claim 3 wherein the controller is configured to tune at least one of the first antenna tuner or the second antenna tuner based on the receive signal.

10. The communications system of claim 9 wherein the controller is configured to tune at least one of the first antenna tuner or the second antenna tuner based on a received signal strength indicator.

11. The communications system of claim 1 wherein, in the simplex operating mode, the controller operates the duplexer so that the first antenna port is used for transmit signals and not receive signals and the second antenna port is used for receive signals and not transmit signals.

12. The communications system of claim 1 wherein, in the switch combining mode, the controller operates the duplexer so that the first antenna port is used for transmit signals and receive signals and the second antenna port is used for diversity receive functionality.

13. The communications system of claim 1 wherein the duplexer includes a plurality of switches that are configured to dynamically route signals between the first antenna port, the second antenna port, the transmit port, and the receive port.

14. A radio-frequency (RF) module comprising:
a packaging substrate configured to receive a plurality of components; and
a communications system implemented on the packaging substrate, the communications system including a duplexer having a transmit port as input for a transmit signal, a receive port as output for a receive signal, a first antenna port, and a second antenna port, the duplexer configured to route the transmit signal from the transmit port to the first antenna port or to the second antenna port based on an antenna select signal, and to route the receive signal to the receive port from the first antenna port or from the second antenna port based on the antenna select signal; and the communications system including a controller configured to provide the antenna select signal to the duplexer and to switch between a switch combining operating mode that causes the duplexer to route the transmit signal from the transmit port to the first antenna port and to route the receive signal from the first antenna port to the receive port, and a simplex operating mode that causes the duplexer to route the transmit signal from the transmit port to the first antenna port and to route the receive signal from the second antenna port to the receive port.

15. The RF module of claim 14 wherein, in the simplex operating mode, the controller operates the duplexer so that the first antenna port is used for transmit signals and not receive signals and the second antenna port is used for receive signals and not transmit signals.

16. The RF module of claim 14 wherein, in the switch combining mode, the controller operates the duplexer so that the first antenna port is used for transmit signals and receive signals and the second antenna port is used for diversity receive functionality.

17. The RF module of claim 14 wherein, in the simplex operating mode, the duplexer is configured to route the transmit signal from the transmit port to the first antenna port during a plurality of transmission slots with individual transmission slots separated by transmission interslot periods and to route the receive signal to the receive port from the second antenna port during a plurality of reception slots with individual reception slots separated by reception interslot periods.

18. A wireless device comprising:
a transceiver configured to generate a transmit radio-frequency (RF) signal and receive a receive RF signal;
a plurality of antennas; and
a front-end module (FEM) in communication with the first antenna and the second antenna, the FEM including a packaging substrate configured to receive a plurality of components, the FEM further including a communications system implemented on the packaging substrate, the communications system including a duplexer having a transmit port as input for a transmit signal, a receive port as output for a receive signal, a first antenna port, and a second antenna port, the duplexer configured to route the transmit signal from the transmit port to the first antenna port or to the second antenna port based on an antenna select signal, and to route the receive signal to the receive port from the first antenna port or from the second antenna port based on the antenna select signal; and the communications system including a controller configured to provide the antenna select signal to the duplexer and to switch between a switch combining operating mode that causes the duplexer to route the transmit signal from the transmit port to the first antenna port and to route the receive signal from the first antenna port to the receive port, and a simplex operating mode that causes the duplexer to route the transmit signal from the transmit port to the first antenna port and to route the receive signal from the second antenna port to the receive port.

19. The wireless device of claim 18 wherein, in the switch combining mode, the controller operates the duplexer so that the first antenna port is used for transmit signals and receive signals and the second antenna port is used for diversity receive functionality.

20. The wireless device of claim 18 wherein, in the simplex operating mode, the duplexer is configured to route the transmit signal from the transmit port to the first antenna port during a plurality of transmission slots with individual transmission slots separated by transmission interslot periods and to route the receive signal to the receive port from the second antenna port during a plurality of reception slots with individual reception slots separated by reception interslot periods.

* * * * *